(12) United States Patent
Kim

(10) Patent No.: US 12,203,762 B2
(45) Date of Patent: Jan. 21, 2025

(54) REAL-TIME CARBON FOOTPRINT ESTIMATION

(71) Applicant: Ford Global Technologies, LLC, Dearborn, MI (US)

(72) Inventor: Hyung Chul Kim, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 17/443,015

(22) Filed: Jul. 19, 2021

(65) Prior Publication Data

US 2023/0015077 A1  Jan. 19, 2023

(51) Int. Cl.
*G01C 21/34* (2006.01)
*G06Q 10/0631* (2023.01)

(52) U.S. Cl.
CPC ..... *G01C 21/3469* (2013.01); *G01C 21/3461* (2013.01); *G06Q 10/06315* (2013.01); *G06Q 2220/00* (2013.01)

(58) Field of Classification Search
CPC .......... G01C 221/3469; G01C 21/3461; G01C 10/06315; G01C 2220/00; G01C 21/3682
USPC ......... 701/490, 104, 533, 532, 410, 22, 123, 701/538, 431, 25, 117, 420
See application file for complete search history.

(56) References Cited

U.S. PATENT DOCUMENTS

| 10,850,629 | B2 | 12/2020 | Miftakhov et al. |
| 2002/0096886 | A1* | 7/2002 | Schmitz .................. B60K 6/46 290/40 C |
| 2011/0191186 | A1* | 8/2011 | Levy .................. G06Q 30/0241 709/227 |
| 2019/0057396 | A1* | 2/2019 | Cui ..................... G06Q 30/018 |
| 2019/0108516 | A1 | 4/2019 | Jawaharlal et al. |
| 2020/0111175 | A1 | 4/2020 | Uyeki et al. |
| 2020/0200649 | A1* | 6/2020 | Ammoura ............ B60W 40/09 |

OTHER PUBLICATIONS

H. Karimi, J. Ansari, A. Gholami and A. Kazemi, "A comprehensive well to wheel analysis of plug-in vehicles and renewable energy resources from cost and emission viewpoints," 2014 Smart Grid Conference (SGC), Tehran, Iran, 2014, pp. 1-6, doi: 10.1109/SGC.2014.7151040. (Year: 2014).*

* cited by examiner

*Primary Examiner* — Anne Marie Antonucci
*Assistant Examiner* — Jodi Jones
(74) *Attorney, Agent, or Firm* — Vincent Mastrogiacomo; McCoy Russell LLP

(57) ABSTRACT

Methods and systems are provided for estimating a carbon footprint of a vehicle in real-time. In one example, the carbon footprint is estimated based on blockchain data. The blockchain data may record carbon emissions generated along one or more energy supply chains of the vehicle, and the estimated carbon footprint may be displayed at a user interface at a list of estimated carbon footprints corresponding to recharging or refueling sites.

9 Claims, 10 Drawing Sheets

REAL-TIME CARBON FOOTPRINT ESTIMATION

FIELD

The present description relates generally to methods and systems for estimating, in real-time, a carbon footprint of a vehicle during vehicle operation.

BACKGROUND/SUMMARY

With respect to reducing emissions that contribute to climate change, low emission powertrain technologies are becoming increasingly attractive. For example, battery electric vehicles (BEVs), hybrid electric vehicles (HEVs), plug-in hybrid electric vehicles (PHEVs), and fuel cell electric vehicles (FCEVs) may generate reduced carbon emissions, particularly in comparison to vehicles powered exclusively by an internal combustion engine (ICEVs). In addition, use of low carbon fuels in ICEVs as alternatives to gasoline may similarly generate lower emissions.

Carbon footprint, a measure of climate change impact, is the total greenhouse gas emissions caused by a product, activity, and service, often expressed as a carbon dioxide equivalent. Tail pipe emissions, which may be included in pump-to-wheel (PTW) emissions, however, are not the only measure of a vehicle's carbon footprint of driving, i.e., a well-to-wheels (WTW) carbon footprint which includes both PTW and well-to-pump (WTP) contributions. For example, the WTP contributions may include upstream generation of electricity and production of fuels, which may emit variable amounts of carbon depending on the generation mode, processing techniques, storage and distribution efficiency, etc. Furthermore, the WTP emissions may fluctuate on a daily or even hourly basis. Thus, while an operator may be able to determine estimations of tail pipe emissions based on information specific to a vehicle and powertrain type, data regarding WTP emissions may not be readily available. As such, when refueling/recharging the vehicle, an operator may unknowingly increase the vehicle's WTW carbon footprint and at least partially offset the carbon-reduction benefits of the low emission powertrain technology.

Attempts to address estimating a complete carbon footprint of driving a vehicle include executing a power balancing algorithm at a control server of an electric vehicle supply equipment (EVSE) connected to a power grid of a building. For example, as shown by Miftakhov et al., in U.S. Pat. No. 10,850,629, a power grid may be coupled to an electrical system generating electrical energy based on a renewable source, such as a PV panel. A vehicle charging carbon emission footprint may be calculated based on power drawn from the power grid by electrical devices of the building and from a percentage of power derived from carbon emission-producing sources at a specific time of day. Thus, the control server may schedule charging of the electric vehicle at a time that minimizes a carbon footprint of the charging. The scheduled charging may depend on user-defined parameters, such as carbon footprint threshold, charging time, anticipated trip mileage, etc.

However, the inventors herein have recognized potential issues with such systems. As one example, the estimated carbon footprint of charging does not address carbon-based emissions associated with other recharging sites, such as when the vehicle is travelling and recharging is demanded at a location away from the building. Additionally, the algorithm is not applicable to other energy production means, such as fuel synthesis and processing. A more complete carbon emissions estimate is not provided by the approach described by Miftakhov et al. and therefore carbon footprints of different recharging stations are not compared to allow a user to select a recharging site that results in a lowest possible carbon footprint.

In one example, the issues described above may be addressed by a method for utilizing blockchain data to estimate a potential carbon footprint of driving a vehicle in real-time, wherein the blockchain data includes carbon emissions generated along an energy supply chain of the vehicle. The method further includes displaying, at a user interface a list of estimated carbon footprints corresponding to recharging or refueling sites. In this way, carbon emissions data from the energy supply chain may be recorded and made accessible to the vehicle's control system as well as all entities included in the energy supply chain. As such, upstream sources of carbon emissions, e.g., emission resulting from processes occurring upstream of energy consumption at the vehicle, may be accounted for in the carbon footprint estimate.

As one example, the method may include obtaining information regarding WTP processes published as blockchain data for each of a list of available recharging/refueling options. A vehicle control system may access the blockchain data and determine a WTP carbon footprint according to the available recharging/refueling options. The WTP carbon footprint may be added to a PTW carbon footprint to estimate a total carbon footprint of driving, i.e., a WTW carbon footprint for the vehicle based on the available options in real-time, thereby allowing an operator to make an informed selection for recharging/refueling. By publishing carbon emissions data to the blockchain, a verifiable, immutable, and universally accessible method for tracking actual carbon emissions as well as a potential effect of the emissions on the WTW carbon footprint is provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
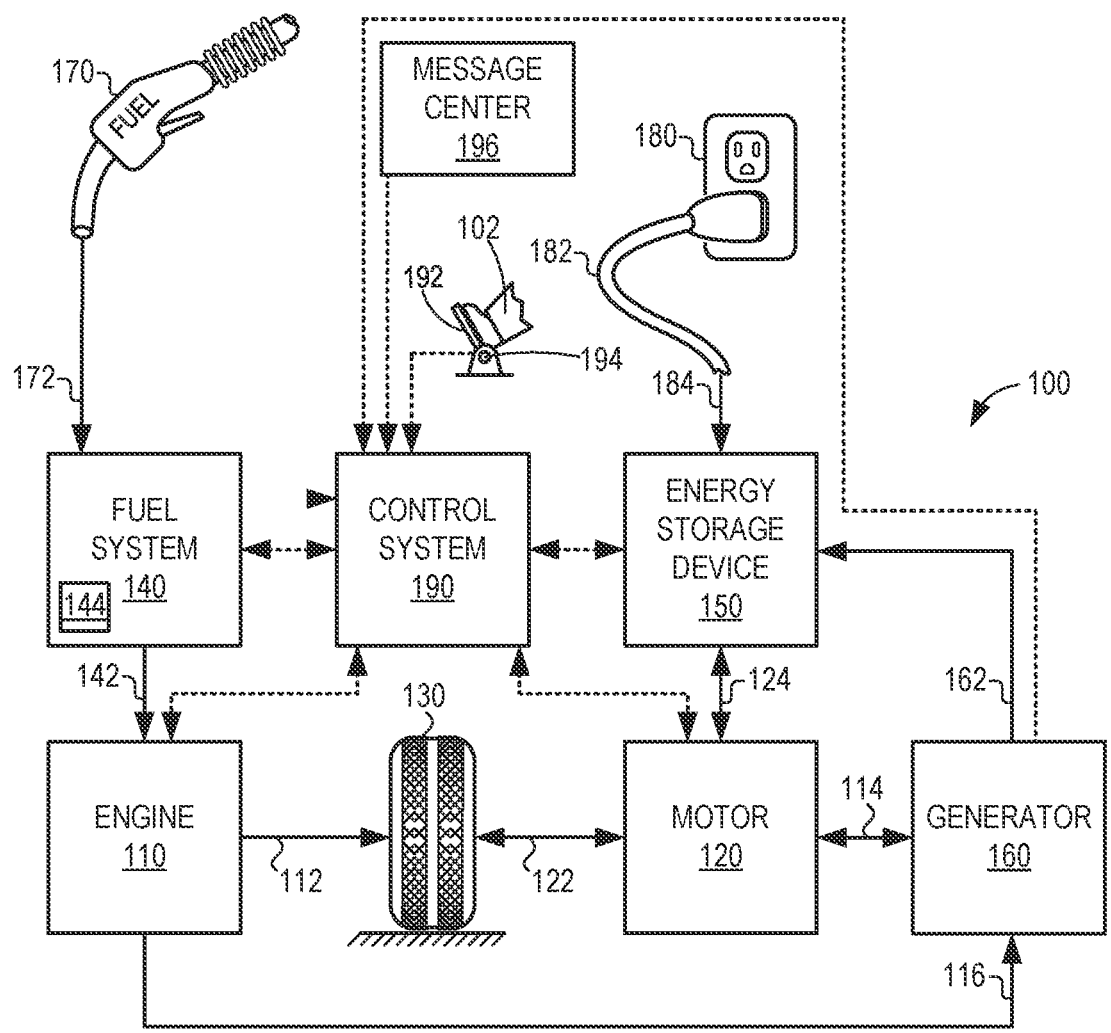
FIG. 1 shows an example of a vehicle propulsion system including a control system communicatively coupled to a network.
Figure 2:
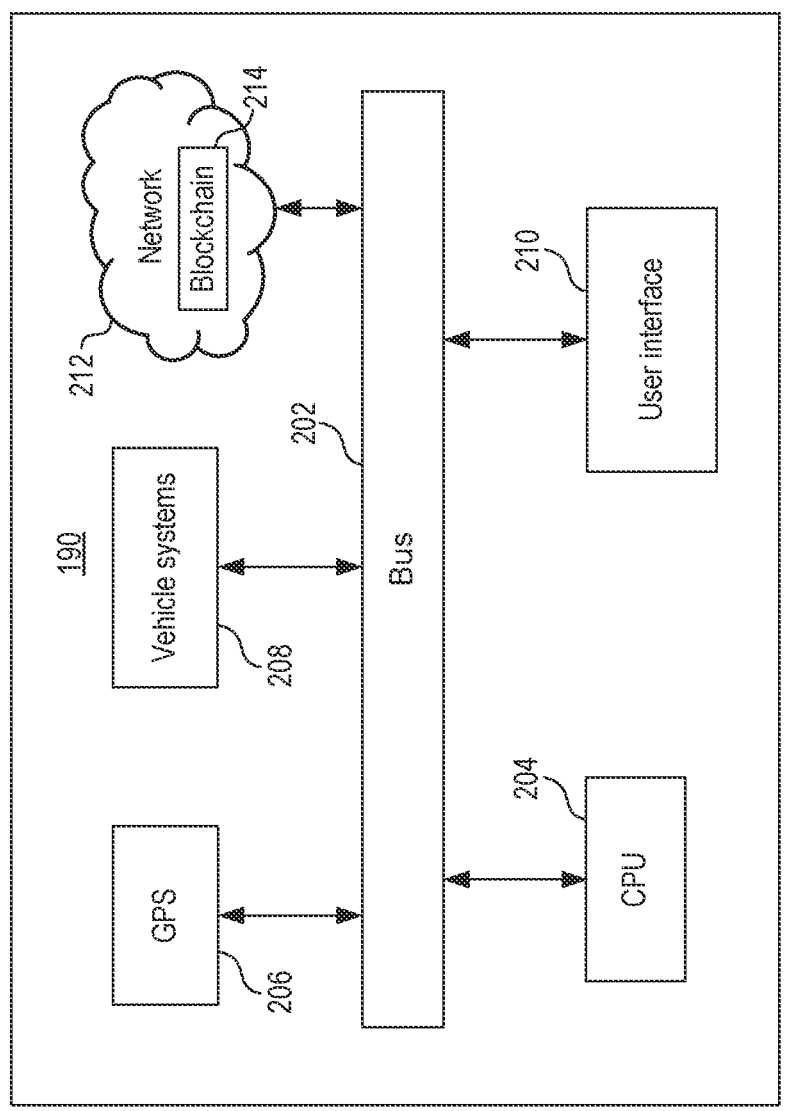
FIG. 2 shows an example configuration of the control system of FIG. 1, including a connection between the control system and a blockchain hosted on the network.
Figure 3:
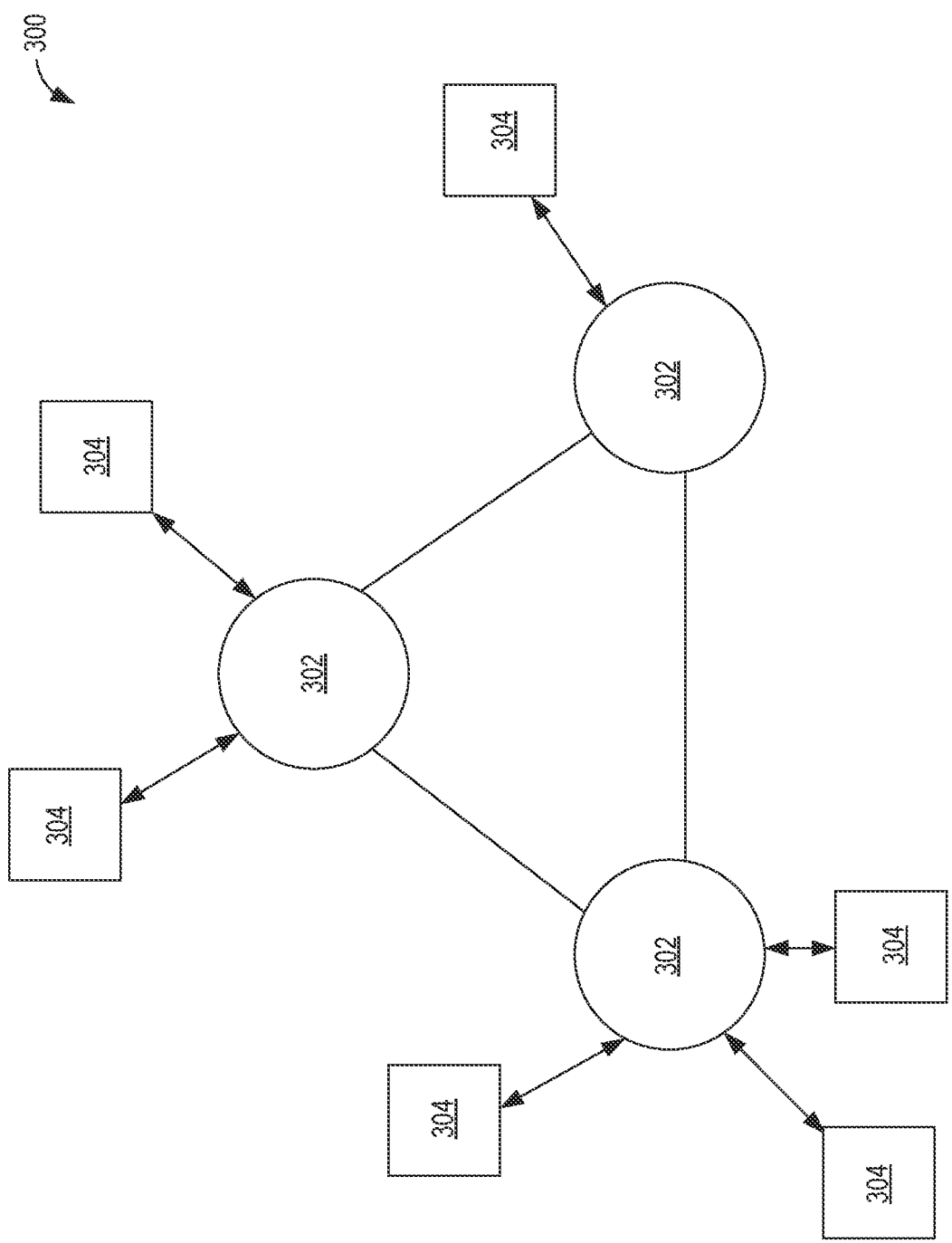
FIG. 3 shows an example of a blockchain network which may be used to record carbon emission data for determining a well-to-wheels (WTW) carbon footprint of a vehicle.
Figure 4:
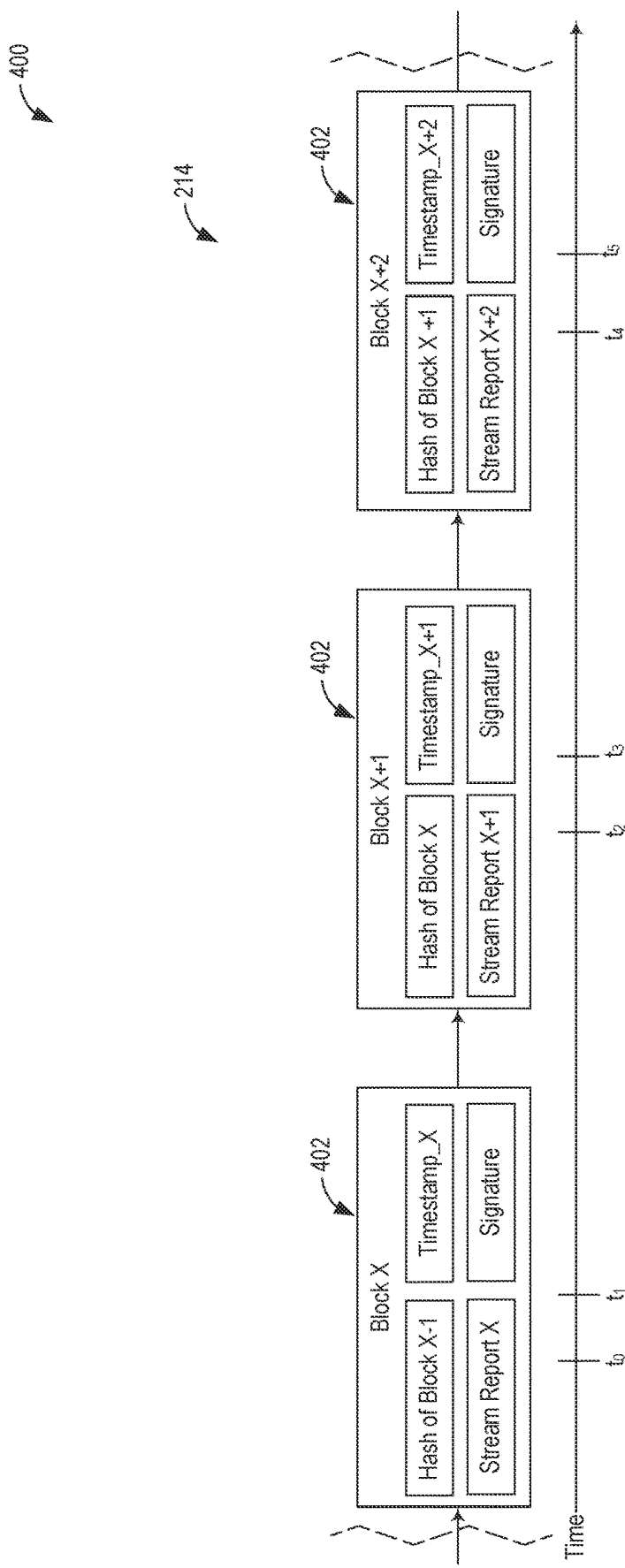
FIG. 4 shows a block diagram of a blockchain, such as the blockchain of FIG. 2.
Figure 5:
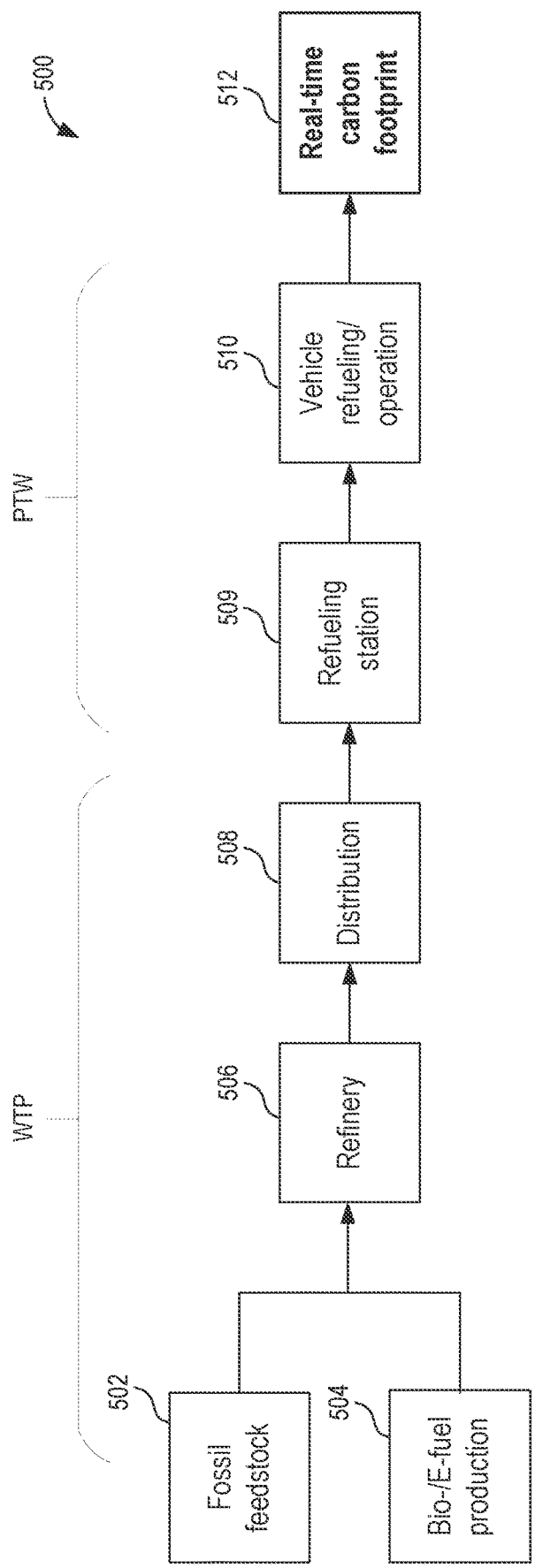
FIG. 5 shows a first flow diagram illustrating information sources used to estimate the real-time WTW carbon footprint of a fuel-combusting vehicle.
Figure 6:
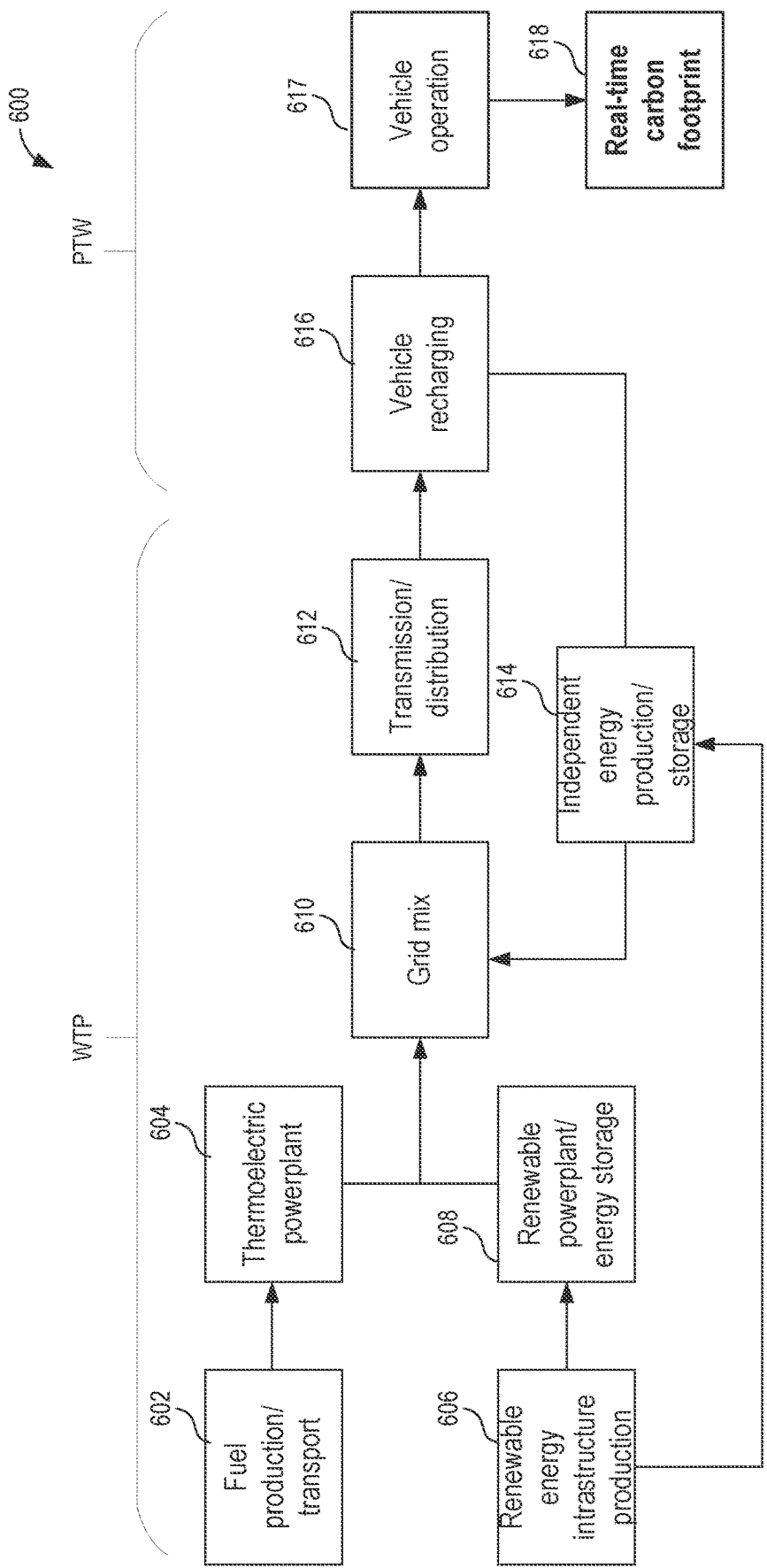
FIG. 6 shows a second flow diagram illustrating information sources used to estimate the real-time WTW carbon footprint of a vehicle powered by electrical energy.
Figure 7:
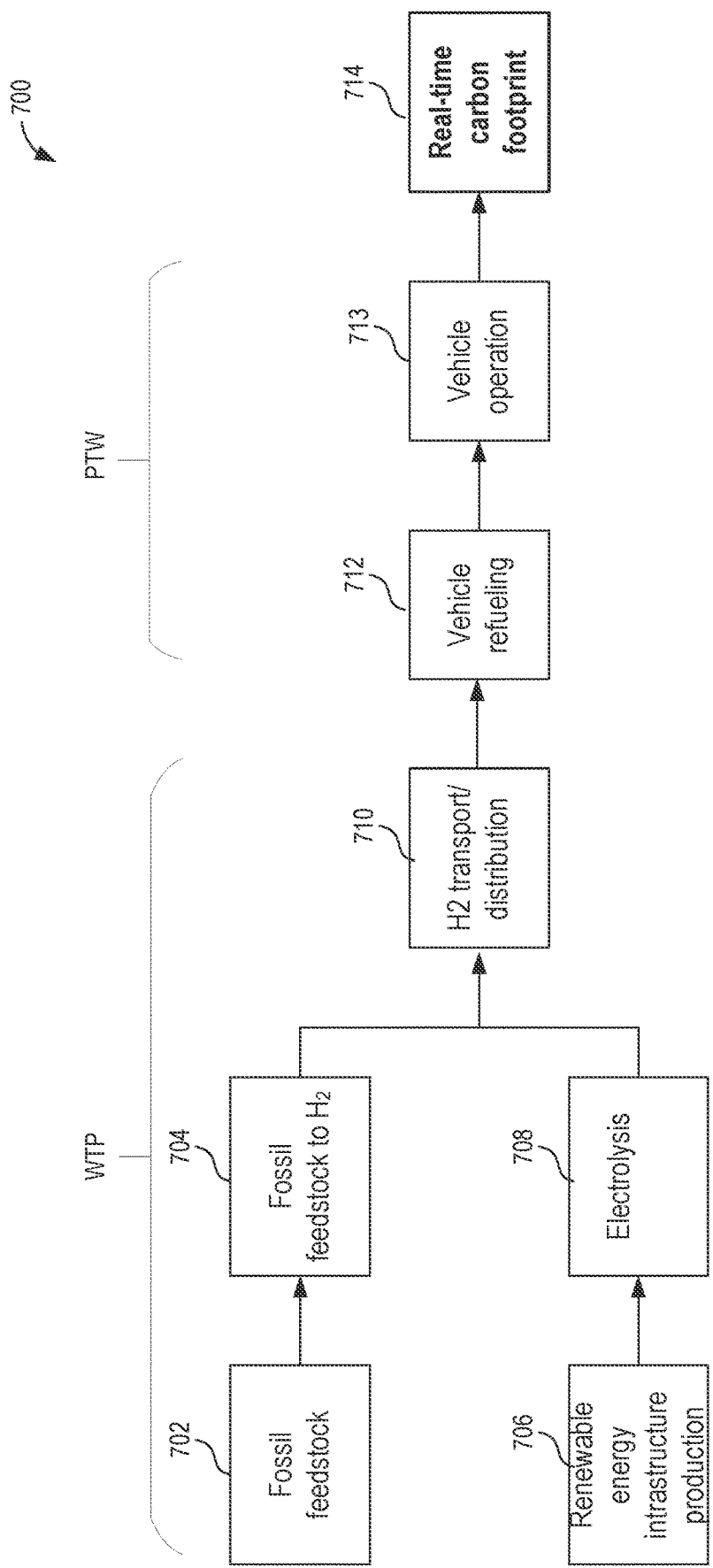
FIG. 7 shows a third flow diagram illustrating information sources used to estimate the real-time WTW carbon footprint of a vehicle powered by a fuel cell.
Figure 8:
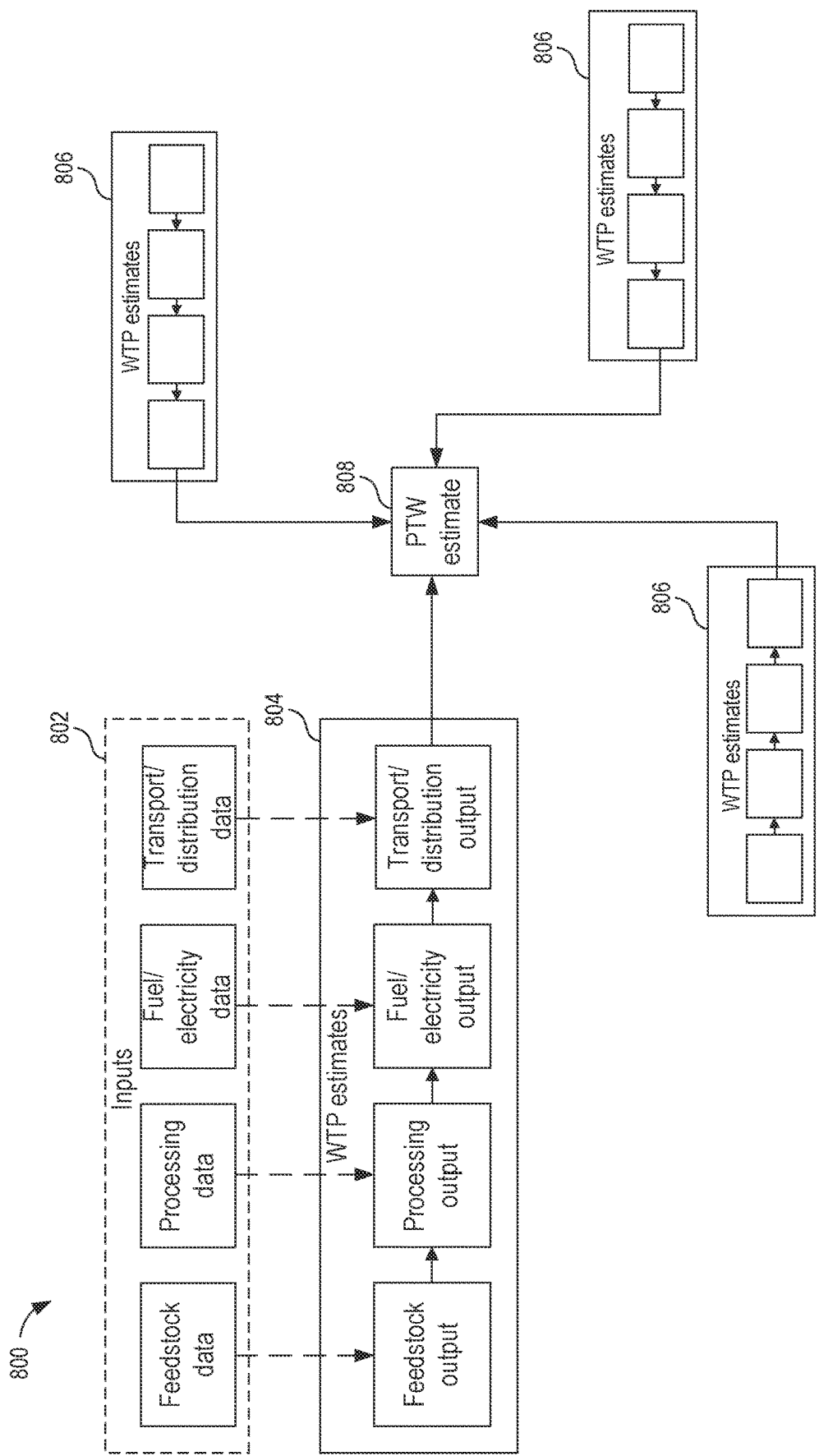
FIG. 8 shows an example data flow architecture for estimating the real-time WTW carbon footprint of a vehicle.
Figure 9:
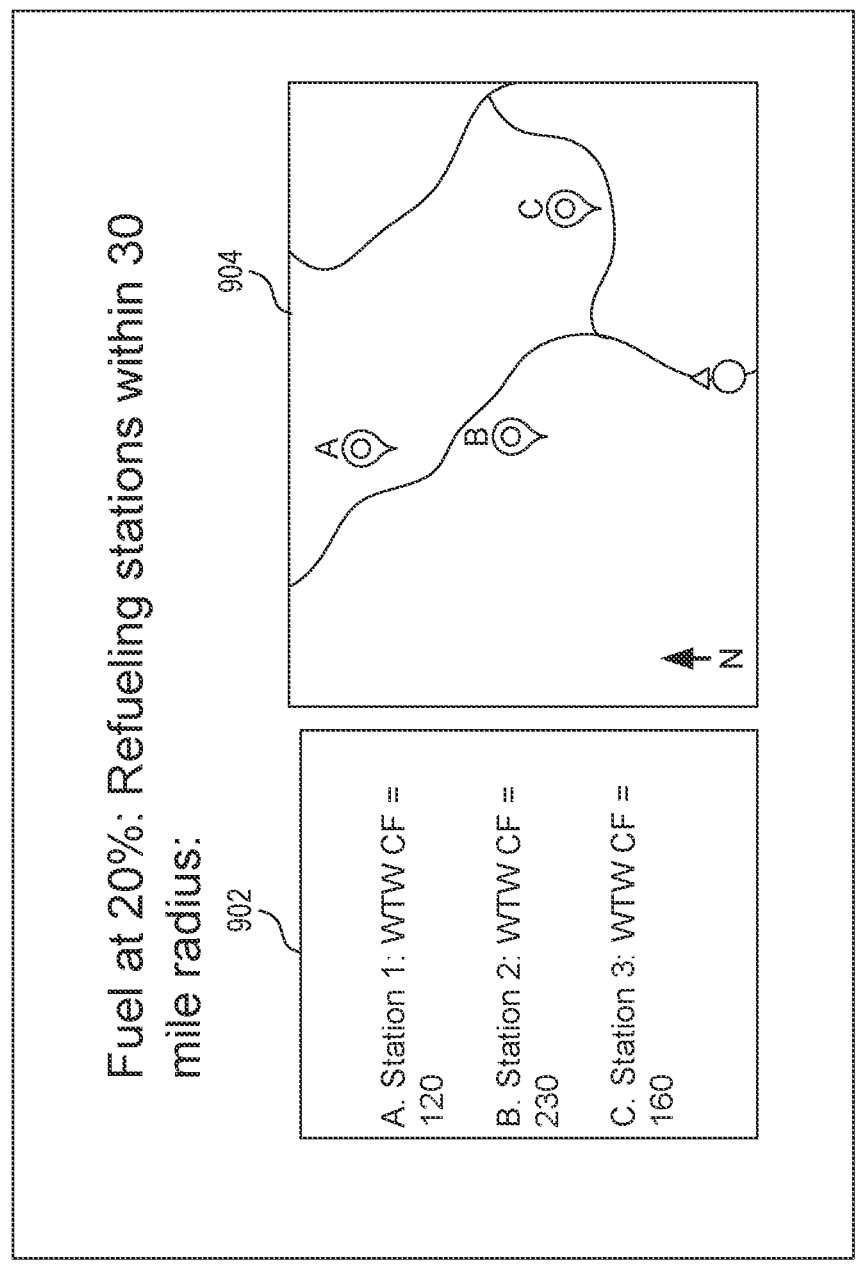
FIG. 9 shows an example of user interface for displaying estimated WTW carbon footprint information in real-time.
Figure 10:
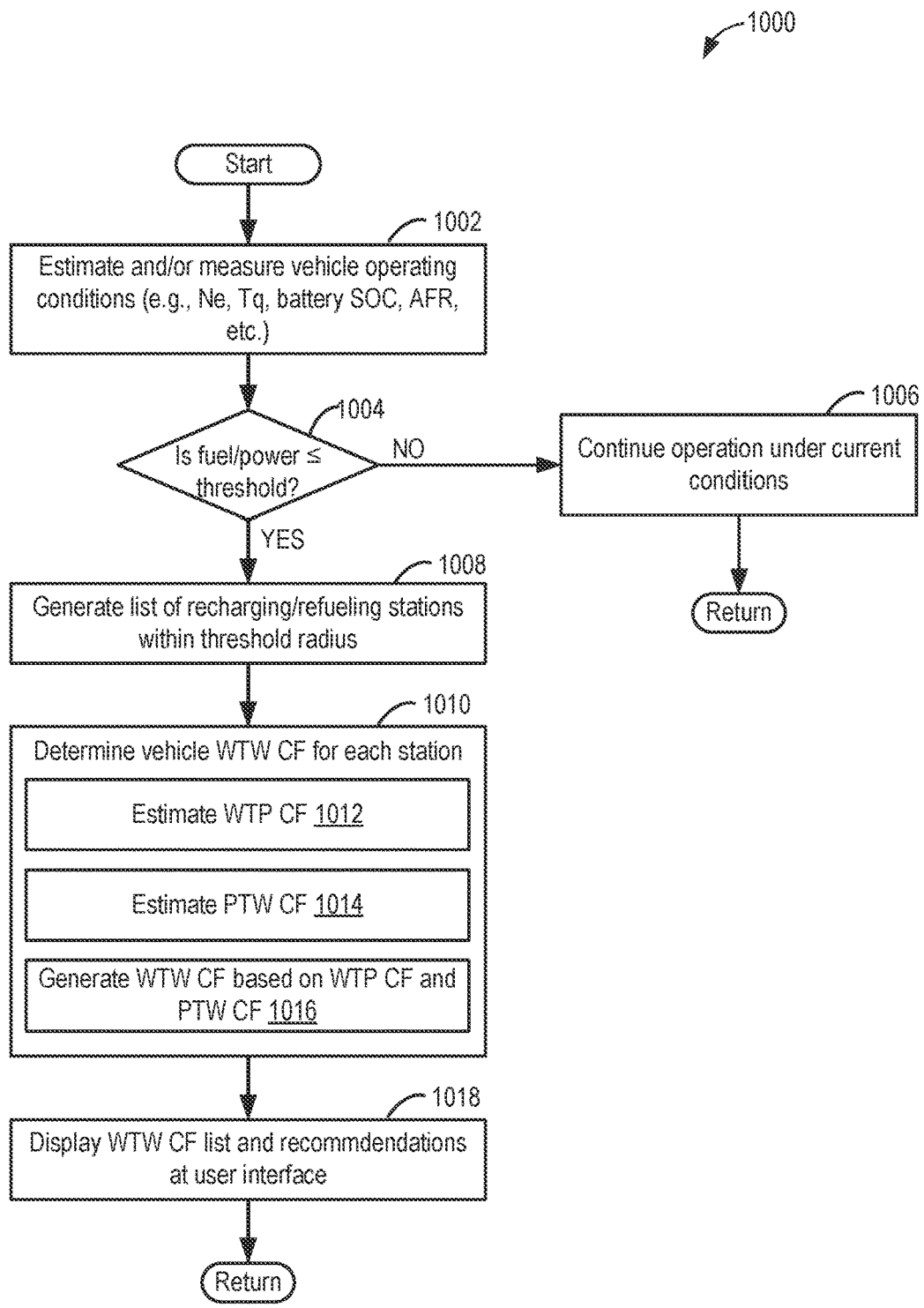
FIG. 10 shows an example of a method for determining a WTW carbon footprint of a vehicle based on blockchain data.

The following description relates to systems and methods for estimating a carbon footprint of driving a vehicle in real-time. An example of a vehicle propulsion system is depicted in FIG. 1, including a vehicle control system. The estimation may be executed by instructions implemented at the vehicle control system which may be communicatively coupled to a network hosting a blockchain, as shown in FIG. 2. As illustrated in FIG. 3, the blockchain may publish data from members of a blockchain network in blocks, where the blocks of the blockchain is depicted in a diagram shown in FIG. 4. Examples of information sources, including blockchain network members, providing carbon emissions data used to estimate an overall carbon footprint of driving a vehicle are shown in FIGS. 5-7, for different vehicle types. The carbon emissions data may be input as indicated in FIG. 8 to determine a WTW carbon footprint of the vehicle and results of the determination may be displayed as a user interface as shown in FIG. 9. An example of a method for estimating the WTW carbon footprint of the vehicle based on available recharging/refueling sites is depicted in FIG. 10, which illustrates how a user may be presented with options for recharging/refueling and informed of the carbon footprint associated with each option in real-time.

FIG. 1 illustrates an example propulsion system 100 of a vehicle. Vehicle propulsion system 100 includes a fuel burning engine 110 and a motor 120. As a non-limiting example, engine 110 may be an internal combustion engine and motor 120 may be an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, alcohol fuels, biofuels, and electrofuels (e-fuels). In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Further details of control system 190 are described further below, with reference to FIG. 2.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 and power source 180. While the vehicle propulsion system is operated to propel the vehicle, electrical energy transmission cable 182 may be disconnected between power source 180 and energy storage device 150. Control system 190 may identify and/or control the amount of electrical energy stored at the energy storage device, which may be referred to as the state of charge (SOC).

In other embodiments, electrical energy transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a display (e.g., a user interface) at a vehicle dashboard 196.

While the vehicle propulsion system 100 is depicted as a hybrid powertrain for illustrative purposes, estimation of the vehicle's carbon footprint as described herein is applicable to various other types of vehicle propulsion systems. For example, the vehicle may be a battery electric vehicle (BEV) relying exclusively on energy storage device 150 to drive motor 120 and as such, engine 110 and fuel system 140 may be omitted. Alternatively, the vehicle may be an internal combustion engine vehicle (ICEV) deriving propulsion energy solely from fuel combustion. In such instances, energy storage device 150, motor 120, and generator 160 may be omitted.

The propulsion system of the vehicle may determine an amount of emissions released from the vehicle during refueling/recharging and operation, where the emissions from the vehicle are hereafter referred to as a pump-to-wheel (PTW) carbon footprint. For example, the PTW carbon footprint of the HEV may be lower compared to the ICEV while the PTW carbon footprint of the BEV may be zero. For an environmentally conscious user, the BEV may appear to be a lowest emitting vehicle powertrain when only PTW emissions are taken into consideration. However, a true carbon footprint of driving the vehicle includes more complex metrics than vehicle emissions alone.

For example, when recharging the BEV from a power grid, electrical energy may be supplied to the power grid via one or more processes that generate carbon emissions, e.g., during processes upstream of vehicle propulsion in an energy supply chain. Hereafter, emissions produced during power generation upstream of PTW operations are referred to as a well-to-pump (WTP) carbon footprint. Similarly, while tail pipe emissions are zero for a fuel cell electric vehicle (FCEV), the WTP carbon footprint may not be zero.

For a PHEV, adjustment of operation mode, e.g., all-electric vs. fuel combustion vs. a combination of electricity and fuel, may have a direct effect on both the PTW and the WTP. As an example, depending on which operation mode is predominantly used, the PTW emissions may vary which may moderate a preference for recharging vs. refueling. A balance between recharging and refueling may propagate upstream to affect the WTP carbon footprint.

Additionally, in instances where the vehicle is an ICEV, emerging fuel technologies may enable combustion of bio-fuels, e-fuels, etc., in combination with or in place of conventional fossil fuels. Although the ICEV may have a higher PTW carbon footprint than the PHEV, BEV, HEV, or FCEV, in some examples, fuel extraction, refining and/or production may generate less carbon emissions than electrical energy production.

In order to provide a complete assessment of the total carbon footprint of driving a vehicle, consideration of both the WTP and the PTW emissions is required to determine a well-to-wheel (WTW) carbon footprint. Furthermore, to allow a user to make informed decisions regarding vehicle operation and recharging/refueling events, a platform for sharing carbon emission data that is accessible to the user, as well as all entities involved in the WTW processes, is needed.

In one example, estimation of the WTW carbon footprint of the vehicle may be enabled by storing the emissions information in a blockchain. Blockchain storage allows the data to be stored in a distributed public ledger, enabling a decentralized consensus of replicated, shared, and synchronized transactions amongst points of entry known as nodes or peers. The blockchain allows carbon footprint information to be recorded in a transparent and immutable manner without relying on a central database to control transaction validity. For example, the emissions and energy data used to determine the WTW carbon footprint may be multi-layered due to a network structure of fuel and electricity supply chains. By using blockchain storage, data providers may standardize data format and a collection method, thereby increasing an accuracy and accountability of data compared to, for example, a centralized server. In addition, stakeholders, e.g., members of a blockchain network including customers, can peer-review blockchain data and WTW carbon footprints to ensure transparent and unbiased estimates of real-time carbon footprint are obtained. Further details of the information added to the blockchain for estimating the vehicle's WTW carbon footprint are provided further below, with reference to FIGS. 2-10.

The blockchain may be accessed by the vehicle's control system, e.g., control system 190 of FIG. 1, via a network, as depicted in FIG. 2. Therein, control system 190 includes a data bus 202 configured to communicate with various devices and systems. For example, the data bus 202 may be a Controller Area Network (CAN) or a Local Interconnect Network (LIN) protocol bus, with wired and/or wireless technologies. The data bus 202 may be communicatively coupled to a central processing unit (CPU) 204. The CPU may further include a microprocessor, input/output ports, an electronic storage medium for executable programs (e.g., executable instructions) and calibration values, such as a non-transitory read-only memory chip, random access memory, keep alive memory, etc.

A position determining device 206, such as a global positioning system (GPS), vehicle systems 208, including a battery, an electric motor, various sensors and actuators of the vehicle, etc., and a user interface 210, may also be communicatively coupled to the data bus 202. The user interface 210 may include a human-machine interface (HMI) located within a cabin of the vehicle, such as at vehicle dashboard 196 of FIG. 1, for example. In some examples, the user interface 210 may further include a remote unit such as a mobile device equipped with application software for communicating with the data bus 202. Other components and systems not shown in FIG. 2 may also be coupled to the data bus 202.

The data bus 202 may communicate wirelessly with a network 212. In one example, the network 212 may be the public Internet. In other examples, however, the network 212 may be a private network connection and may include, for example, a virtual private network or an encryption or other security mechanism employed over the public Internet. A blockchain 214 may be accessed through the network 212.

As such, control system 190 may access information from the blockchain 214 through the data bus 202. The blockchain 214, as described above, may be a public ledger providing an active accounting of transactions and may be maintained by various network participants where the network participants are nodes of the blockchain 214. For example, as illustrated in FIG. 3, a blockchain network 300 may include a distributed group of nodes 302 which may communicate with one another and store a replica of the blockchain (e.g., the blockchain 214 of FIG. 2). The blockchain is subject to consensus among the nodes 302.

In one example, the blockchain may be used to record carbon emissions data from operations included in the WTW processing of energy, e.g., electric and fuel, delivered to a vehicle. Thus, the blockchain may be formed of a series of blocks, as shown in FIG. 4, each block representing a set of recorded data published to the blockchain via the nodes 302. Each operation recorded may include a unique blockchain ID, a user ID, an operation ID, etc. As shown in FIG. 3, user terminals 304 (e.g., computers, tablets, mobile devices, etc.) may communicate with the nodes 302 via the network (e.g., the network 212 of FIG. 2), and provide carbon emissions data to the blockchain. Data may be entered into the blockchain at any of the user terminals 304 and the data may be associated with any of the unique IDs described above, allowing the data to be categorized as a type of data. For example, determination of whether the data represents an operation corresponding to a WTP carbon footprint or a PTW carbon footprint may be enabled based on the ID recorded with the data.

The blockchain may be initially written as a series of software instruction by, for example, one of the user terminals 304 of the blockchain network 300. The software instructions may include computer code for defining how the blockchain operates, for example, how often blocks are published to the blockchain, how often carbon footprint estimations are updated, etc. Thus, the blockchain may initially be constructed by one or more user terminals 304 on the blockchain network 300, added to the blockchain network 300, downloaded by the nodes 302 on the blockchain network 300, and then maintained by nodes 302 on the network 300. The user terminals 304 may be each assigned to a member of the blockchain network 300. The members may include fossil fuel extraction companies, electrical energy producers, refineries, processing plants, distribution sites, charging/refueling stations, etc.

When data is published to the blockchain, a stream report may be generated based on a smart contract associated with the data content, where the smart contract may be one or more programs stored on the blockchain that are executed when predetermined conditions are met. For example, the smart contract may be configured to publish a new stream report based on changes in data monitored at one of the user terminals 304. As one example, one of the user terminals 304 may be used to record electricity generated by wind turbines of a wind farm. The predetermined conditions may include generating a stream report when a rate of electricity generation at the wind farm varies by a threshold amount. As an intermittent source of energy production, generation of electricity at the wind farm may fluctuate according to weather patterns and stream reports may therefore be generated at a frequency reflecting the weather patterns. The stream report may be recorded to a block of the blockchain, as depicted in FIG. 4.

FIG. 4 shows an example block diagram 400 of a portion of the blockchain 214 of FIG. 2. The blockchain 214 is formed of a series of blocks 402, strung together in a sequence and individually labelled as Block X, Block X+1, etc. While only one stream report is shown for each of the blocks 402 for clarity, it should be appreciated that a plurality of stream reports may be reported to a single block in the blockchain. In other words, a single block in the blockchain may include more than one stream report.

Each block in the blockchain 214 includes a hash (e.g., a mathematical function configured to convert inputs of variable lengths to encrypted outputs of a fixed length) of a previous block in the blockchain 214, a stream report (as described above), a timestamp denoting when the block is added, and a digital signature from a member that verifies that the stream report is witnessed.

Formation of the blockchain 214 may begin at t0, in one example, with predetermined conditions being met at an entity of an energy supply chain. For example, a rate of oil production may change by a threshold amount. A first stream report is generated at t1 indicating corresponding changes in carbon emissions. The first stream report may be reported to the blockchain 214 as part of Block X and a time stamp (Timestamp_X) may be recorded according to t1. Similarly, a second stream report may be generated at t3 and reported to the blockchain 214 at t4 as part of Block X+1. A third stream report may be generated at t5 and reported to blockchain 214 at t6 as part of Block X+2. As such, blocks are added to the blockchain 214 as stream reports are published at a node of the blockchain 214. The blocks cannot be removed or altered, thereby providing an unchangeable record of information for determining a WTW carbon footprint of a vehicle.

Data provided by members of the blockchain network may include various types of data recorded at the blockchain. A control system of a vehicle, such as control system of 190 of FIGS. 1 and 2, may include instructions stored in memory at the CPU to estimate a WTW carbon footprint of the vehicle based on the blockchain data. Examples of data which may be published to the block for carbon footprint estimation are shown in FIGS. 5-7 for different type of vehicle powertrains.

For example, turning first to FIG. 5, an example flow of data collected from various members providing both WTP and PTW carbon emission information is depicted in a first flow diagram 500 for an ICEV. The first flow diagram 500 may also be applied to an HEV or a PHEV operating in an HEV mode, i.e., a charge sustaining mode. At 502 of the first flow diagram 500, WTP carbon footprint data includes emission information from a fossil feedstock production site. The fossil feedstock production site may be, for example, an oil well, and carbon emissions generated during drilling and oil extraction may be collected and published to a blockchain (e.g., the blockchain 214 of FIGS. 2 and 4). Energy and materials with fossil fuel origins may be used during fossil fuel collection and leakage may occur during transfer and transport of the fossil fuel, which may each contribute to the WTP carbon footprint.

The WTP carbon footprint data may also include emission information from a biofuel or e-fuel production site at 504, collected in parallel with the information from the fossil fuel feedstock production site. For example, a biofuel may be produced at a site where biomass is fermented to generate ethanol and an e-fuel may be produced at a site where water is electrolyzed into hydrogen and oxygen gases and the hydrogen gas is combined with carbon dioxide to form methanol. Although biofuel and e-fuel production may be considered to have no direct carbon footprint, energy and material inputs derived from fossil fuels may be incorporated into a production process of the bio/e-fuels which may indirectly contribute to carbon emissions.

At 506 of the first flow diagram 500, the WTP carbon footprint data further includes emission information from a refinery. At the refinery, the biofuel and/or the e-fuel may be mixed with fuel (e.g., a petroleum-derived fuel) from the fossil feedstock production site to form a target fuel blend to be combusted in an ICE. As described above for both 502 and 504, a process of blending the fuels may include energy and material inputs derived from fossil fuel sources, thereby adding to the WTP carbon footprint.

At 508, the WTP carbon footprint data includes contributions from distribution of the fuel to a distribution network. Emissions may be released resulting from losses during distribution, e.g., leakage, spillage, etc., as well as energy consumed during transport of the fuel to distribution centers and final destinations of the network. For example, the fuel (e.g., blended or exclusively derived from the fossil feedstock) may be transported to and stored at a refueling station. Losses at the refueling station, e.g., at 509 of the first flow diagram 500, may also release carbon in some instances. More specifically, in examples where the fuel is compressed natural gas (CNG) or liquefied natural gas (LNG), vented carbon emissions from a fuel reservoir at the refueling station may add to the PTW carbon footprint.

At 510, PTW carbon footprint information may also be obtained from the vehicle receiving the fuel from the refueling station. Carbon emissions, resulting from fuel combustion at the vehicle during vehicle operation may vary based on a particular blend of fuels combusted by the vehicle's engine and by a rate of fuel consumption, e.g., a fuel economy, of the vehicle. The PTW carbon footprint may include emissions during refueling. For example, methane leakages during refueling of CNG and LNG vehicles may contribute to the PTW carbon footprint at the refueling station (e.g., 1 g methane is equivalent to 30 g carbon dioxide).

The carbon emission data, with respect to fuel economy of the vehicle, may be supplied based on signals received by a control system of the vehicle, e.g., control system 190 of FIG. 1, from various sensors of the vehicle. For example, information from an exhaust sensor indicating an air-to-fuel ratio at the engine, driving habit data obtained based on torque demand as determined by accelerator pedal depression and engine speed, a rate of fuel consumption based on fuel volume in a fuel tank, type of fuel, engine parameters specific to a type of engine installed in the vehicle, etc. As such, carbon emissions from the vehicle may demonstrate relatively low variation.

From 502 to 508 of the first flow diagram, however, the carbon emission data may be obtained from blockchain data published by members of a blockchain network. For example, each entity associated with 502 to 508, e.g., the fossil feedstock production site, the refinery, the distribution network, etc., may have one or more user terminals of the block network monitoring carbon emissions from the entity. The one or more user terminals may stream data to a node of the blockchain network, which may continuously publish new blocks to the blockchain network as predetermined conditions for establishing new records are met, as described above with reference to FIGS. 3 and 4. In some examples, carbon emission data may be published at an hourly rate. In other examples, new blocks may be added to the blockchain on a daily basis. The rate at which carbon emission data is updated from each user terminal may depend on localized fluctuations specific to the entity. For example, while WTP carbon emissions of refueling may remain relatively low and uniform, carbon emissions associated with electricity at the recharging station may vary according to time of day. Depending on a location of the recharging station, a carbon footprint at an electrical recharging outlet may be lowest during a peak energy production time of PV and highest at night time when energy production via PV is minimal.

At 512 of the first flow diagram 500, a real-time carbon footprint, e.g., a WTW carbon footprint of the vehicle may be determined. For example, the control system may be configured with one or more algorithms for collecting WTP carbon emissions data from the blockchain, via a network such as the network 212 of FIG. 2, and PTW carbon emission data from the vehicle sensors. In one example, the WTW carbon footprint may be estimated as a total of the WTP and the PTW carbon emissions. As shown in a data flow diagram 800 in FIG. 8, the WTP carbon emissions may be determined from specific input data 802 to generate a first set of WTP carbon emission estimates 804 as outputs via equations described below. The input data 802 may be provided, for example, by stream reports generated and published at the blockchain, as shown in FIG. 4.

The first set of WTP carbon emission estimates 804 may be added to a PTW carbon emissions estimate 808 of a vehicle, determined based on an equation described below, to obtain a potential WTW carbon footprint specific to an energy supply chain. Furthermore, the data flow diagram 800 depicts additional sets of WTP carbon emissions estimates 806, similarly determined from blockchain data, which may each be combined with the PTW carbon emissions estimate 808 to generate a different WTW carbon footprint corresponding to each of the additional sets of WTP carbon emissions estimates 806. For example, the first set of WTP carbon emission estimates 804 as well as each of the additional sets of WTP carbon emissions estimates 806 may represent an individual energy supply chain distributing fuel or electrical energy to a particular refueling or recharging station, respectively. Each combination of one of the sets of WTP carbon emissions estimates with the PTW carbon emissions estimate, may result in a different estimated WTW carbon footprint projected for refueling/recharging the vehicle at the corresponding station based on published blockchain data.

The input data 802 indicated in FIG. 8 used to determine a WTP carbon footprint (WTP CF) of the vehicle may include, for example, energy and materials use for extracting, transporting, and refining fuels as well as building infrastructure, as depicted in 502-508 of FIG. 5. The input data may allow carbon emissions for variables including the fossil feedstock, fuel processing, fuel production (bio/e-fuel), and distribution, to be quantified. The sets of WTP carbon emissions estimates may be inferred from the input data to provide an estimate of greenhouse gas (GHG) emissions in grams of carbon dioxide equivalent per mile (gCO2e/mile).

For example, the WTP carbon footprint (WTP CF) of the ICEV or HEV may be estimated based on equation 1 below, where A is energy use in MJ/MJ, B is material use in kg/MJ, a is a fossil carbon intensity of producing A in gCO2e/MJ, and b is a fossil carbon intensity of producing B in gCO2e/kg, C is direct fossil carbon emissions from WTP in g CO2e/MJ, and H is an energy content of fuel or heating value in MJ/gal.

$$WTP\ CF(gCO2e/\text{mile}) = [(Aa+Bb+C)*H]/mpg \quad (1)$$

When fuels with various WTP CF are mixed in a refueling station, an average WTP CF may be determined based on an energy balance. As shown in FIG. 8, the WTP carbon emissions estimates may be added to the PTW carbon emissions estimate of the vehicle.

As an example, a PTW carbon footprint (PTW CF) of the ICEV or HEV may be estimated based on equation 2 below, where D is a fossil carbon content in the fuel in g/MJ, which may correspond to a specific type of fuel dispensed at a refueling station.

$$PTW\ CF(gCO2e/\text{mile}) = [D*(44/12)*H]/mpg \quad (2)$$

As such, the PTW CF is an estimate of carbon emissions generated at the vehicle based on the specific type of fuel consumed by the vehicle and the monitored, current fuel economy of the vehicle. For example, the current fuel economy of the vehicle may be determined according to how the vehicle is driven (e.g., city driving vs. highway), driver habits, an AFR of the engine, etc., tracked since a previous estimate of the PTW CF. For CNG and LNG vehicles, evaporative emissions from the refueling station, PTW CF-ev may be determined according to equation 3 below, and added to the PTW CF:

$$PTW\ CF\text{-}ev(gCO2e/\text{mile}) = L*M/mpgge \quad (3)$$

where L is an evaporative emission rate in gram per gasoline gallon equivalents (g/gge), M is a CO2 equivalency factor, e.g., 30 g CO2e per g methane, and mpgge is fuel economy in mile per gasoline gallon equivalents.

The WTW carbon footprint (WTW CF) is a sum of equations 1 and 2, as shown below by equation 4.

$$WTW\ CF(gCO2e/\text{mile}) = [(Aa+Bb+C)+D*(44/12)]*H/mpg \quad (4)$$

For CNG and LNG vehicles, the evaporative carbon footprint from refueling station, PTW CF-ev may be added to the WTW carbon footprint. The WTW CF for 502 to 508 of the first flow diagram 500 may therefore be determined based on blockchain data provided by participating members of a fuel supply chain, e.g., providing data for variables A, B, C, D, H, a, and b in equations 1-2 and 4. As illustrated in FIG. 8, the PTW carbon emissions estimate may be determined independent of the WTP carbon emissions estimates and may be comparatively uniform. In other words, variables contributing to the WTP carbon emissions may demonstrate higher emissions variability and may be obtained from more than one source of WTP carbon emissions, each source providing an output to determine a WTP carbon footprint that is combined with the PTW carbon emissions estimate to obtain a total carbon footprint.

In one example, the WTW CF corresponding to each refueling station available to the vehicle may be displayed at a user interface, e.g., the user interface 210 of FIG. 2. As described above, the user interface may be located in the vehicle cabin, e.g., at the dashboard 196 of FIG. 1, or may additionally or alternatively be a mobile device, communicatively linked to the vehicle control system and controlled by application software. An example of a user interface 900 is illustrated in FIG. 9. The user interface 900 may provide information regarding a fuel state of the vehicle, such as an indication of a fuel level decreasing to a threshold level, such as to 20% of a total fuel capacity of the vehicle's fuel tank, as shown in FIG. 9.

The user interface 900 may also include a list of refueling stations 902 within a threshold radius of the vehicle, such as within a 30 mile radius. The list of refueling stations 902 may include refueling stations dispensing a fuel type combusted by the vehicle and a projected WTW CF of the vehicle according to each refueling station of the list. For example, as shown in FIG. 9, three stations are shown in the list of refueling stations 902, each associated with a different estimated WTW CF. The estimated WTW CF of each refueling station may be determined based on equations 1-4, as described above, where at least a portion of the carbon emissions data used in the estimations may obtained via the blockchain.

In some examples, the user interface 900 may include additional information, such as a map 904 of the refueling stations within the threshold radius, as shown in FIG. 9. The additional information (not shown in FIG. 9) may further include suggested timing, e.g., time of the day, that the WTW CF is anticipated to be lowest for each of the refueling stations, whether recharging or refueling will result in the lowest WTW CF for a PHEV, suggestions for driving modes that will result in the lowest WTW CF (fuel combustion vs. all-electric for a PHEV), etc. It will be appreciated that the user interface 900 is a non-limiting example of a user interface displaying WTW CF estimations to an operator and various other display configurations are possible.

A WTW CF of an electric vehicle, such as a BEV or a PHEV operating in an electric vehicle (EV) mode, i.e., charge depletion mode, may be determined by a similar data flow as described for the ICEV. For example, a second flow diagram 600 is shown in FIG. 6, illustrating a flow of data collected from blockchain network members to obtain WTP carbon emission information. At 602 of the second flow diagram 600, WTP CF data includes emissions released during fuel production and fuel transport where the fuel is used at a thermoelectric plant to generate electricity. For example, fuel production and transport may include coal mining, natural gas extraction, and transport of the fuel to the thermoelectric plant. The WTP CF data also includes emissions resulting from operation of the thermoelectric plant at 604, e.g., on-site carbon emissions.

Carbon emissions contributing to the WTP CF may also be collected from renewable energy sources, in parallel with 602 and 604. For example, at 606, carbon emission information may be obtained from electrical energy production via renewable energy sources such as PV and/or wind turbines. While the renewable energy sources may not directly release carbon emissions, infrastructure production (e.g., construction) for each renewable energy source may indirectly contribute to the WTP CF. For example, carbon footprints of PV and wind turbine energy production may arise from materials used and transport of supplies for construction of PV panels and turbine structures.

Electrical energy produced by PV and wind turbines may be directed to an energy storage facility. Energy and material inputs for a thermoelectric powerplant infrastructure, e.g., for construction, operation, maintenance, etc., as well as energy storage losses, may also contribute to the WTP CF data at 608. For example, the energy storage losses may increase a reliance on energy supply from the thermoelectric powerplant, thereby increasing carbon emissions from a fuel supply chain (e.g., 602 and 604). Electricity from both the thermoelectric plant and the renewable powerplant may be conducted to a power grid of an electrical utility. Changes in the power grid mix contributes to the WTP CF at 610 due to differences between a fossil carbon footprint and a renewable electricity carbon footprint. In addition, transmission and distribution losses at 612 may drive increased electrical production to meet a demand at the electrical grid, thereby leading to higher emissions at the energy production sites.

The WTP CF may further include emission data from an independent renewable energy source (e.g., PV or wind) at 614. The independent renewable energy source may, for example, be located at a private residence and may input electrical energy to the utility or directly to the EV. A contribution of the independent renewable energy source may arise from energy storage losses which may reduce a reliance on renewable electricity in the EV. As such, the WTP CF may also include carbon emissions from manufacturing equipment for renewable electricity generation such as residential rooftop PV panels at 606.

PTW CF information may be obtained from the vehicle at 616 of the second flow diagram 600. When the vehicle is the BEV or the PHEV operating in a charge depletion mode, the tail pipe emissions may be zero but the PTW CF may vary based on charging losses during recharging events. For example, electrical losses during recharging may drive increased energy production, e.g., as described above with respect to transmission and distribution losses.

The charging losses and fuel economy of the vehicle, while depicted in the PTW CF section of the second flow diagram 600, may also have a direct effect on upstream emission sources, e.g., in the WTP CF section. The vehicle may therefore have a PTW CF of zero but the vehicle parameters may affect the WTW CF by modifying the WTP contributions per mile traveled.

Additionally, when the vehicle is the PHEV and not operating in the EV mode, i.e., a charge sustaining mode, the PTW CF of the PHEV may vary based on the issues described above for the ICEV and HEV and also on a fuel economy of the PHEV. Thus, data regarding vehicle operation at 617 of the second flow diagram 600 may also be used to determine the PTW CF. The fuel economy of the PHEV in the charge sustaining mode may be affected by variables such as engine efficiency, driving behaviors, traffic condition, and weather. The PTW CF of the PHEV in the charge depletion mode may be zero but when operating in the charge sustaining mode, may vary according to equation 2.

The WTP CF of the BEV or the PHEV operating in the charge depletion mode may be estimated based on equation 5, where A, B, C, a, and b are parameters as described above with reference to equation 1 and EF is an energy efficiency, including charging losses, of the vehicle in MJ per mile. As the PTW CF for the electric vehicle is zero, as described above, equation 5 is also an estimation of the WTW CF of the vehicle.

$$WTP\ CF(CO2e/\text{mile}) = (Aa + Bb + C) * EF \qquad (5)$$

The carbon emission data for the WTP CF may be obtained from a blockchain publishing records from blockchain members, such as electrical energy producers, powerplants, transmission and distribution substations and other entities in an energy supply chain, which may include both a fuel supply chain and an electrical supply chain, as described above. For renewable energy sources, emissions may show greatest fluctuations at specific times of the day. For example, energy harvested by PV panels may be greatest mid-day and may be unavailable overnight. Wind energy may vary according to weather patterns on an hourly or daily basis. Emissions embedded in the electric grid mix, e.g., at 610 of the second flow diagram 600 of FIG. 6, may therefore fluctuate according to a distribution of electrical energy supply across the associated energy sources. For example, carbon emissions may be lower when energy is primarily supplied by PV or wind and higher when electricity is predominantly provided by the thermoelectric powerplant.

At 618 of the second flow diagram 600, the WTW CF of the vehicle may be determined (e.g., based on equation 5 and according to the data flow diagram 800 of FIG. 8) and displayed at a user interface, such as the user interface 900 of FIG. 9, according to available recharging stations. The user may be notified of WTW CFs associated with each recharging option and make an informed and educated selection based on the provided information.

In another example, a WTW CF of a FCEV may be determined by a similar data flow as described above with reference to FIGS. 5 and 6. For example, a third flow diagram 700 is shown in FIG. 7, illustrating a flow of data collected from blockchain network members to obtain WTP carbon emission information. The FCEV may be propelled by electrical energy produced by an electrochemical reaction at a fuel cell where oxygen and hydrogen gases are combined to form water and heat. Similar to the BEV, the FCEV may have zero tailpipe emissions but an upstream production and transport of hydrogen feedstocks may have a non-zero carbon footprint, depending on the hydrogen source.

At 702 of the third flow diagram 700, WTP CF data includes emission information from a fossil feedstock production site. For example, carbon may be emitted during fossil feedstock production such as natural gas extraction due to use of energy and materials with fossil fuel origins. Furthermore, losses may occur during transfer and transport of the fossil feedstock. Emission data contributing to the WTP CF of the FCEV may also include carbon emitted during hydrogen extraction from the fossil feedstock at 704.

In one example, the fossil feedstock may be natural gas and hydrogen may be extricated from the natural gas by steam reforming which may generate and emit carbon dioxide unless captured. In addition, energy and material inputs to drive fossil feedstock processing to produce hydrogen may be sources of carbon emissions.

Emission information from renewable energy technologies for hydrogen production may be collected in parallel with 702 and 704. For example, at 706, data may be obtained from infrastructure production of electrical energy via PV panels and/or wind turbines, as described above with reference to 606 of FIG. 6. The electrical energy may be directed to a facility where water is electrolyzed to generate hydrogen at 708. Electrolysis may be associated with energy and materials usage that contribute to carbon emissions, such as construction of a hydrogen production plant and manufacturing proton exchange membrane (PEM) electrolyzers.

At 710, further WTP CF contributions may be obtained from data regarding hydrogen transport to refueling stations by, for example, trucks with compressed gas tanks. A distribution of the hydrogen stored and dispensed at the station between the fossil feedstock and renewable energy technologies as hydrogen sources may affect the WTP CF. For example, in areas where hydrogen is mostly produced from electrolysis using solar and wind power, hydrogen at the hydrogen refueling station may be primarily derived from the renewable feedstock, thereby driving lower carbon emissions than areas where hydrogen production may rely predominantly on fossil feedstocks. Hydrogen fuels with various WTP CF profiles can be mixed in a refueling station. A WTP CF of the hydrogen mix at the refueling station may be an average WTP CF determined based on the hydrogen energy balance of different origins, e.g., PV electrolysis, natural gas reforming, etc.

PTW CF information may be obtained from the vehicle at 712 of the second flow diagram 600. For example, refueling losses at and a fuel economy of the FCEV may impact the PTW CF. Furthermore, the fuel economy may depend on a user's driving habits, e.g., based on vehicle operation at 713 of the third flow diagram 700, an efficiency of the fuel cell, etc. The refueling losses and the fuel economy, while depicted in the PTW CF section of the third flow diagram 700, may have a direct effect on upstream emission sources, e.g., in the WTP CF section. The vehicle may therefore have a PTW CF of zero but the vehicle parameters may affect the WTW CF by modifying the WTP contributions where the WTP CF contributions may be obtained and updated via a blockchain.

The WTP CF of the FCEV, which may also be the WTW CF, may be determined by equation 5 above and according to the data flow diagram 800 of FIG. 8. At 714, the WTW CF may be displayed at a user interface, such as the user interface 900 of FIG. 9, according to available refueling stations. The user may be notified of WTW CFs associated with each recharging option and make an informed and educated selection based on the provided information.

A method 1000 for determining a WTW CF of a vehicle in real-time is shown in FIG. 10. Method 1000 may be implemented in various types of vehicles, including an ICEV, a BEV, an HEV, a PHEV, an FCEV, etc. Instructions for carrying out method 1000 may be executed by a vehicle control system, such as control system 190 of FIGS. 1 and 2, based on instructions stored on a memory of the control system and in conjunction with signals received from sensors of the engine system, such as the sensors described above.

At 1002, the method includes estimating and/or measuring current vehicle operating conditions. For example, torque demand, a battery SOC, engine speed, an air-to-fuel ratio (AFR) of the vehicle when the vehicle includes an engine, etc, may be determined. The control system may also monitor parameters such as a distance the vehicle travels per unit of fuel or electrical energy, e.g., an energy efficiency of the vehicle, how the energy efficiency varies according to a time of day or a travel route, and for PHEVs, the control system may track conditions and periods of time during which the PHEV combusts fuel versus conditions during which the PHEV is propelled by electrical energy.

The method includes confirming if a fuel level or battery SOC falls to or below a threshold level at 1004. For example, the threshold level for the ICEV or HEV may be a fuel level decreasing to 10% of a fuel tank capacity. For a non-fuel combusting vehicle, such as the BEV, FCEV, or PHEV operating in an all-electric mode, the threshold level may be a percentage of a full charge of the battery, such as 20%. If the fuel or battery SOC is above threshold level, the method proceeds to 1006 to continue vehicle operation under the current conditions. The method returns to the start.

If the fuel level or battery SOC decreases to at least the threshold level, the method continues to 1008 to generate a list of recharging and/or refueling stations within a threshold radius of the vehicle. For example, when the vehicle is the ICEV or the HEV, the control system may refer to a GPS, such as the GPS 206 of FIG. 2, to locate gas stations within a 30 mile radius of a current location of the vehicle. Similarly, when the vehicle is the BEV, HEV, or FCEV, the control system may use the GPS to find recharging stations within the threshold radius of the vehicle. The threshold radius may be a minimum distance that the vehicle is able to continue operating based on the current fuel level or battery SOC.

At 1010, the method includes determining a WTW CF for each recharging/refueling station of the generated list. For example, determining the WTW CF includes estimating a WTP CF at 1012. The WTP CF, with respect to each station, may be estimated based on blockchain data published by blockchain members of a blockchain specific to an energy supply chain associated with each station, as described above. For example, the blockchain members may be various entities involved in enabling vehicle propulsion, including energy production/extraction sites, powerplants, and transmission and distribution substations, as shown in FIGS. 5-8. The blockchain data may represent current, real-time carbon emission information and may be used as inputs, as shown by the data flow diagram 800 of FIG. 8 and equations 1 and 5, to output the estimated WTP CF.

Determining the WTW CF may also include estimating the PTW CF of the vehicle at 1014. For example, when the vehicle is the ICEV or HEV, the PTW CF may be estimated according to equations 2 and 3 where information regarding characteristics of a fuel dispensed to the vehicle (such as a fuel blend and a fuel energy content) may be provided from vehicle information stored in a memory of a control system of the vehicle or in a database hosted by a network that is accessible by the control system. When the vehicle is the BEV, FCEV, or PHEV operating in the all-electric mode, the PTW CF may be zero.

In addition, determining the WTW CF may include combining the estimates of the WTP CF and the PTW CF at 1016. For example, for propulsion powered by fuel-combustion, the WTW CF may be inferred based on equation 4 and for propulsion powered by electrical energy, the WTW CF may be determined by equation 5. As such, individual WTW CFs may be obtained for each station of the list of refueling/recharging stations. For instances where the vehicle is the PHEV and both the fuel level and the battery SOC fall to the threshold level of 1004, the method may include locating both refueling and recharging stations within the respective threshold radii of the vehicle and estimating the WTW CF according to each of the refueling and recharging stations.

At 1018, the method includes displaying the estimated WTW CF of the vehicle associated with each refueling and/or recharging station of the list. In one example, the WTW CFs may be displayed as shown in the user interface 900 of FIG. 9, where the user interface may be located in a vehicle cabin and/or at a mobile device. The control system may also command display of how each of the WTW CFs may vary according to time of day, driving route choice, propulsion by fuel combustion vs. electrical energy (when the vehicle is the PHEV), etc. In some instances, recommendations for a combination of which refueling/recharging station, time of day for refueling/recharging results in a lowest possible WTW CF may be indicated at the user interface. As another example, a ranked list may be provided at the user interface, depicting the WTW CF corresponding to refueling/recharging stations in combination with time of day for refueling/recharging of the vehicle in ascending or descending order. A user may therefore receive real-time estimates of the vehicle WTW CF according to refueling/recharging selection in a transparent and traceable manner, thereby allowing the user to moderate how the vehicle is refueled/recharged to minimize the WTW CF. The method returns to the start.

In this way, a WTW CF of a vehicle may be estimated and continuously updated in real-time, e.g., at a moment when refueling/recharging is demanded and selection of a refueling/recharging option is desired. The WTW CF may be determined by estimating a WTP CF of an energy supply chain and a PTW CF of the vehicle. Carbon emission information for estimating the WTP CF may be obtained from a blockchain where data is published from various entities of an energy supply chain available to the vehicle. The PTW CF, when the vehicle is configured to combust fuel, may be inferred based on a fuel economy of the vehicle and for a vehicle relying exclusively on electrical energy for propulsion, the PTW CF may be zero. By summing the WTP CF with the PTW CF, the WTW CF may be estimated according to a specific refueling/recharging station. As such, the WTW CF of the vehicle may represent a more accurate accounting of total carbon emissions associated with vehicle operation, in addition to tailpipe emissions. Furthermore, the updating of the WTW CF estimations in real-time allows the user to reduce a carbon footprint of vehicle operation according to various conditions, such as propulsion by fuel-combustion vs. electrical energy, time of day to recharge/refuel, type of fuel, driving routes and driving behavior. As a result, the user may make more informed decisions regarding vehicle operation and carbon emissions may be reduced more effectively. It will be noted that the WTW CF of a refueling/recharging option is estimated based on a predicted fuel economy of driving. The anticipated fuel economy may be derived from a past fuel economy history associated with variables such as congestion, weather, driving behavior, and so on. Retrospective measurement and updating of WTW CF may be demanded, for example, every 1 mile, and compared with the estimated WTW CF of a selected refueling/recharging option to increase an accuracy of the estimate and guide the driver regarding strategies to reduce carbon emissions.

The technical effect of utilizing blockchain data to determine a WTW CF of a vehicle is that an accurate and accountable estimate of the WTW CF is provided in real-time. A further technical effect includes enabling carbon emissions of a vehicle to be tracked during vehicle operation, according to vehicle mobility. By tracking the carbon emissions in real-time and utilizing data recorded at a blockchain, carbon emissions generated upstream of the vehicle in an energy supply chain may be determined which may otherwise be difficult to determine due to complexity. As a result of the complexity, estimations of the carbon emissions generated long the energy supply chain determined via conventional methods, such as retroactive calculations and/or using averaged values, may have low accuracy due an inability to account for fluctuations in emissions over short time frames, such as on an hourly basis. By providing estimates in real time according to continuously published blockchain data, a vehicle operator may be presented with data comparing anticipated carbon emissions propagated through a plurality of emission sources according to a possible refueling/recharging option, thereby allowing the operator to select refueling/recharging of the vehicle with a minimal carbon footprint. The accuracy of the estimations may be further increased by incorporating monitored operator driving behavior which may affect emissions directly released by the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein. 4

The disclosure also provides support for a method comprising: utilizing blockchain data to estimate a carbon footprint of a vehicle in real-time, during operation of the vehicle, wherein the blockchain data includes carbon emissions generated along an energy supply chain of the vehicle, and displaying, at a user interface, the estimated carbon footprint in a list of estimated carbon footprints corresponding to recharging or refueling sites. In a first example of the method, estimating the carbon footprint of the vehicle in real-time includes determining well-to-wheels (WTW) carbon emissions and wherein the WTW carbon emissions is a sum of well-to-pump (WTP) carbon emissions specific to the energy supply chain and pump-to-wheels (PTW) carbon emissions specific to the vehicle. In a second example of the method, optionally including the first example, determining the WTW carbon emissions includes estimating the WTP carbon emissions based on the blockchain data. In a third example of the method, optionally including one or both of the first and second examples, determining the WTW carbon emissions includes projecting the WTP carbon emissions according to each recharging and/or refueling site of the list and wherein the list includes recharging and/or refueling sites within a threshold radius of a current location of the vehicle. In a fourth example of the method, optionally including one or more or each of the first through third examples, determining the PTW carbon emissions includes estimating the PTW carbon emissions based on one or more of a type of fuel used by the vehicle, a fuel economy of the vehicle, losses during refueling/recharging, and an energy content of the fuel. In a fifth example of the method, optionally including one or more or each of the first through fourth examples, utilizing the blockchain data includes updating the carbon footprint of the vehicle when a new record is published to the blockchain data. In a sixth example of the method, optionally including one or more or each of the first through fifth examples, updating the carbon footprint includes continuously adjusting the estimated carbon footprint of the vehicle to account for changes to the carbon emissions generated by the energy supply chain and by the vehicle.

The disclosure also provides support for a method for reducing a carbon footprint of a vehicle, comprising: estimating the carbon footprint of the vehicle in real-time based on blockchain data providing carbon emissions information from one or more entities enabling propulsion of the vehicle, and comparing recharging and/or refueling options based on the estimated carbon footprint, and generating recommendations for recharging and/or refueling based on the comparison and displaying the recommendations at a user interface. In a first example of the method, estimating the carbon footprint based on the blockchain data includes obtaining carbon emissions data from a blockchain, the carbon emissions data published to the blockchain by one or more of a fossil feedstock, a biofuel or e-fuel production site, a fossil fuel refinery, a fuel transportation entity, a thermoelectric powerplant, a renewable energy production site, a renewable energy powerplant, an electrical utility site, a transmission and distribution substation, a hydrogen production site, a refueling station, and a recharging station. In a second example of the method, optionally including the first example, estimating the carbon footprint of the vehicle based on the blockchain data further includes determining a well-to-pump carbon footprint (WTP CF) of the vehicle by using the published carbon emissions data as inputs to generate the WTP CF as an output. In a third example of the method, optionally including one or both of the first and second examples, determining the WTP CF of the vehicle further includes using one of a fuel energy content and fuel heating value of a fuel when the vehicle is an internal combustion engine vehicle (ICEV) or a hybrid electric vehicle (HEV). In a fourth example of the method, optionally including one or more or each of the first through third examples, determining the WTP CF of the vehicle further includes using an energy efficiency of the vehicle when the vehicle is one of a battery electric vehicle (BEV), a fuel cell electric vehicle (FCEV), and a plug-in hybrid electric vehicle (PHEV) operating in an all-electric mode. In a fifth example of the method, optionally including one or more or each of the first through fourth examples, the method further comprises: estimating a pump-to-wheels carbon footprint (PTW CF) of the vehicle and wherein the PTW CF is added to the WTP CF to estimate a well-to-wheels carbon footprint (WTW CF) of the vehicle. In a sixth example of the method, optionally including one or more or each of the first through fifth examples, estimating the PTW CF of the vehicle includes determining a fuel economy of the vehicle, losses during refueling, a fossil fuel carbon content and one of a fuel energy content and a fuel heating value of fuel dispensed to the vehicle when the vehicle is an internal combustion engine vehicle (ICEV) or a hybrid electric vehicle (HEV) and wherein the PTW CF of the vehicle is zero when the vehicle is one of a battery electric vehicle (BEV), a fuel cell electric vehicle (FCEV), and a plug-in hybrid electric vehicle (PHEV) operating in an all-electric mode. In a seventh example of the method, optionally including one or more or each of the first through sixth examples, estimating the carbon footprint based on the blockchain data includes updating the carbon footprint when new carbon emissions data is published to the blockchain. In a eighth example of the method, optionally including one or more or each of the first through seventh examples, estimating the carbon footprint based on the blockchain data includes estimating the carbon footprint relative to one or more recharging and/or refueling stations within a threshold vicinity of the vehicle and indicating a lowest estimated carbon footprint according to the one or more recharging and/or refueling stations. In a ninth example of the method, optionally including one or more or each of the first through eighth examples, indicating the lowest estimated carbon footprint further includes estimating a time of day for recharging and/or refueling with a lowest amount of carbon emissions.

The disclosure also provides support for a method for estimating a well-to-wheels carbon footprint (WTW CF) of a vehicle in real-time, comprising: responsive to a fuel level or a battery state-of-charge decreasing to a threshold level, generating a list of recharging and/or refueling stations within a target radius of the vehicle, estimating the WTW CF of the vehicle according to carbon emissions associated with each station of the list, wherein the carbon emissions associated with each station are determined based on data provided by a blockchain, and presenting the list of recharging and/or refueling stations with the estimated WTW CF corresponding to each station to allow a user to select a recharging and/or refueling station based on the estimated WTW CF. In a first example of the method, estimating the WTW CF of the vehicle includes using information regarding a fuel blend combusted by the vehicle when the vehicle includes an engine. In a second example of the method, optionally including the first example, estimating the WTW CF of the vehicle further includes using the data provided by the blockchain to estimate carbon emitted during electrical energy production when the vehicle is propelled by electrical energy.

In another representation, a system for a vehicle includes a prime mover powered by one of fuel combustion and electrical energy, and a controller, configured with instructions stored in non-transitory memory that, when executed, cause the controller to locate recharging or refueling stations within a threshold vicinity of the vehicle, estimate a current total carbon footprint of the vehicle according to each of the located recharging or refueling stations, and display, at a user interface, the estimated total carbon footprint for each of the located recharging or refueling stations. In a first example of the system, the user interface is located in a cabin of the vehicle or at a mobile device.

In another representation, a method includes determining an estimated carbon footprint of a vehicle in real-time, during operation of the vehicle, the estimated carbon calculated based on real-time vehicle operating parameters and further based on blockchain data, wherein the blockchain data stores carbon emissions generated along an energy supply chain of the vehicle, the blockchain data varying depending on a path of the supply chain and determined before current vehicle operation, and displaying, at a user interface, the estimated carbon footprint in a list of estimated carbon footprints corresponding to recharging or refueling sites, the corresponding footprints updated in real time.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for reducing a carbon footprint of a vehicle, comprising:
   tracking carbon emissions information from a plurality of entities along an energy supply chain of the vehicle, wherein tracking the carbon emissions information comprises publishing, by each of the plurality of entities, the carbon emissions information of its respective activities to a node of a blockchain network as blockchain data, wherein the plurality of entities comprise a source of the energy supply chain and intermediaries that process, store, or transport energy generated from the source, wherein the source and the intermediaries are upstream of the vehicle in the energy supply chain;
   receiving, at the vehicle, the blockchain data via the node of the blockchain network;
   estimating the carbon footprint of the vehicle in real-time based on one or more sensors measuring carbon emissions from the vehicle and the blockchain data, wherein estimating the carbon footprint of the vehicle comprises adding the carbon emissions recorded on the blockchain from each of the plurality of entities;
   comparing recharging and/or refueling options based on the estimated carbon footprint, wherein comparing the recharging and/or refueling options comprises comparing how the carbon footprints associated with each of the recharging and/or refueling options vary by a time of day, a driving route, and, when the vehicle is a hybrid electric vehicle, propulsion by fuel combustion versus electrical energy;
   generating a recommendation for a combination of a recharging and/or refueling station and the time of day of recharging or refueling based on the comparison, wherein the recommendation results in a lowest possible carbon footprint; and
   displaying the recommendation for the combination at a user interface;
   wherein estimating the carbon footprint based on the blockchain data includes obtaining carbon emissions data from the blockchain, the carbon emissions data published to the blockchain by the plurality of entities, and wherein the plurality of entities includes two or more of a fossil feedstock, a biofuel or e-fuel production site, a fossil fuel refinery, a fuel transportation entity, a thermoelectric powerplant, a renewable energy production site, a renewable energy powerplant, an electrical utility site, a transmission and distribution substation, a hydrogen production site, a refueling station, and a recharging station;
   wherein estimating the carbon footprint of the vehicle based on the blockchain data further includes determining a well-to-pump carbon footprint (WTP CF) of the vehicle by using the published carbon emissions data as inputs to generate the WTP CF as an output, and wherein determining the WTP CF includes utilizing the carbon emissions from the source and intermediaries that process, store, and transport the energy generated from the source;
   wherein estimating the carbon footprint based on the blockchain data includes estimating the carbon footprint relative to one or more recharging and/or refueling stations within a threshold vicinity of the vehicle and indicating a lowest estimated carbon footprint according to the one or more recharging and/or refueling stations; and
   wherein indicating the lowest estimated carbon footprint further includes estimating a time of day for recharging and/or refueling with a lowest amount of carbon emissions, and wherein displaying the recommendation at the user interface comprises displaying a list of recharging and/or refueling stations within the threshold vicinity of the vehicle, displaying the estimated carbon footprint for each of the recharging and/or refueling stations, displaying a map of the recharging and/or refueling stations within the threshold vicinity, and displaying the estimated time of day associated with the lowest amount of carbon emissions.

2. The method of claim 1, wherein determining the WTP CF of the vehicle further includes using one of a fuel energy content and fuel heating value of a fuel when the vehicle is an internal combustion engine vehicle (ICEV) or a hybrid electric vehicle (HEV).

3. The method of claim 1, wherein determining the WTP CF of the vehicle further includes using an energy efficiency of the vehicle when the vehicle is one of a battery electric vehicle (BEV), a fuel cell electric vehicle (FCEV), and a plug-in hybrid electric vehicle (PHEV) operating in an all-electric mode.

4. The method of claim 1, further comprising estimating a pump-to-wheels carbon footprint (PTW CF) of the vehicle and wherein the PTW CF is added to the WTP CF to estimate a well-to-wheels carbon footprint (WTW CF) of the vehicle.

5. The method of claim 4, wherein estimating the PTW CF of the vehicle includes determining a fuel economy of the vehicle, losses during refueling, a fossil fuel carbon content and one of a fuel energy content and a fuel heating value of fuel dispensed to the vehicle when the vehicle is an internal combustion engine vehicle (ICEV) or a hybrid electric vehicle (HEV), and wherein the PTW CF of the vehicle is zero when the vehicle is one of a battery electric vehicle (BEV), a fuel cell electric vehicle (FCEV), and a plug-in hybrid electric vehicle (PHEV) operating in an all-electric mode.

6. The method of claim 1, wherein each of the plurality of entities publishes the carbon emissions information to a user terminal of the blockchain network, the method further comprising:
   executing a program when the carbon emissions information published to the user terminal varies beyond a threshold, wherein the program generates a stream report and publishes the stream report to the blockchain network; and
   updating the carbon footprint based on the stream report.

7. A method for estimating a well-to-wheels carbon footprint (WTW CF) of a vehicle in real-time, comprising:
responsive to a fuel level or a battery state-of-charge decreasing to a threshold level;
generating a list of recharging and/or refueling stations within a target radius of the vehicle;
estimating the WTW CF of the vehicle according to carbon emissions associated with each station of the list, wherein the carbon emissions associated with each station are determined based on data provided by a blockchain, wherein the data provided by the blockchain includes upstream carbon emissions published by a plurality of entities along an energy supply chain, the energy supply chain comprising a source and one or more intermediaries that process, store, or transport energy generated from the source, wherein the source and the one or more intermediaries are upstream of the vehicle in the energy supply chain, wherein each of the plurality of entities publishes records of the upstream carbon emissions generated by its activities to the blockchain;
presenting, at a user interface:
an indication of the fuel level or the battery state-of-charge at or below the threshold level;
the list of recharging and/or refueling stations with the estimated WTW CF corresponding to each station to allow a user to select a recharging and/or refueling station based on the estimated WTW CF, the list in ascending or descending order of the estimated WTW CF corresponding to each station;
a map of the recharging and/or refueling stations within the target radius; and
an estimated time of day associated with a lowest amount of carbon emissions at each recharging and/or refueling station within the target radius;
generating a recommendation for a recommended recharging and/or refueling station and a recommended time of day for recharging and/or refueling at the recommended recharging and/or refueling station based on minimizing the WTW CF; and
responsive to real-time changes in the data, updating the WTW CF corresponding to each station and the recommendation for a recharging and/or refueling station, wherein the WTW CF is updated each time one of the plurality of entities publishes a new record to the blockchain.

8. The method of claim 7, wherein estimating the WTW CF of the vehicle includes using information regarding a fuel blend combusted by the vehicle when the vehicle includes an engine, and wherein each of the plurality of entities publishes the new record to the blockchain when there is a change in monitored data.

9. The method of claim 7, further comprising presenting a suggested driving mode expected to minimize the WTW CF, wherein, for a hybrid electric vehicle, the suggested driving modes comprise fuel combustion and an all-electric mode, and wherein estimating the WTW CF of the vehicle further includes using the data provided by the blockchain to estimate carbon emitted during electrical energy production when the vehicle is propelled by electrical energy.

* * * * *